(No Model.)  3 Sheets—Sheet 1.
T. HYATT.
ILLUMINATING TILING AND GRATING FOR COVERING VAULTS, ROOFS, &c.
No. 315,412. Patented Apr. 7, 1885.
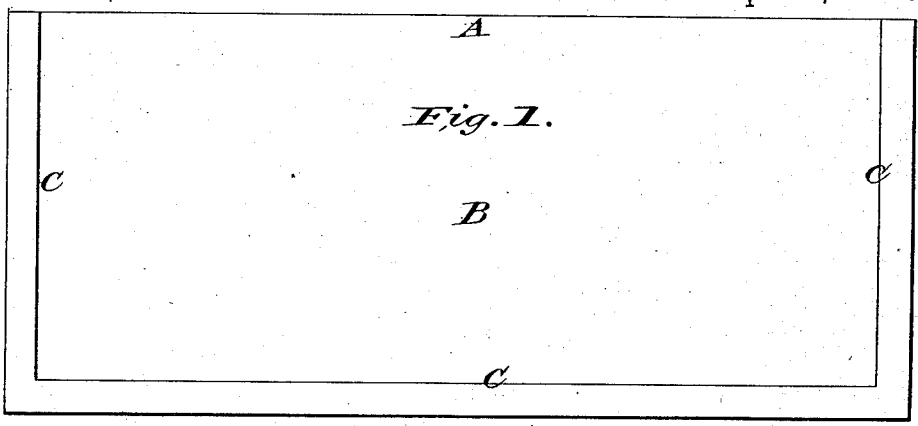
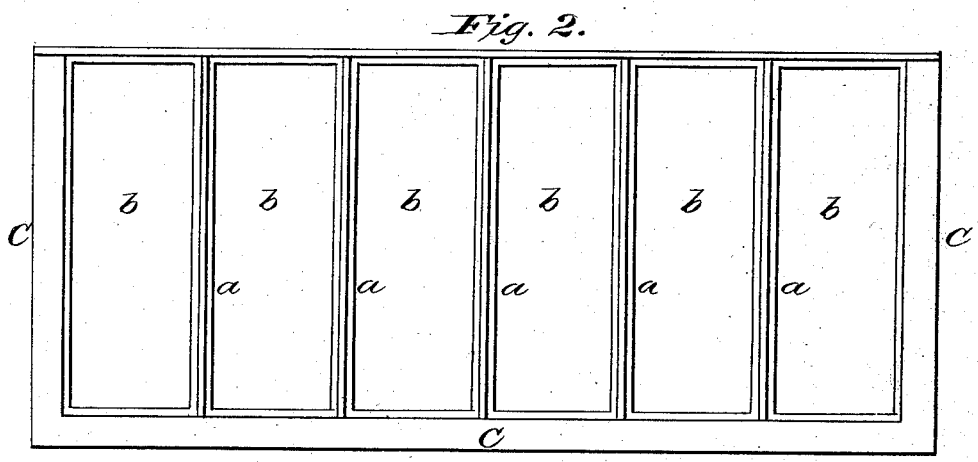
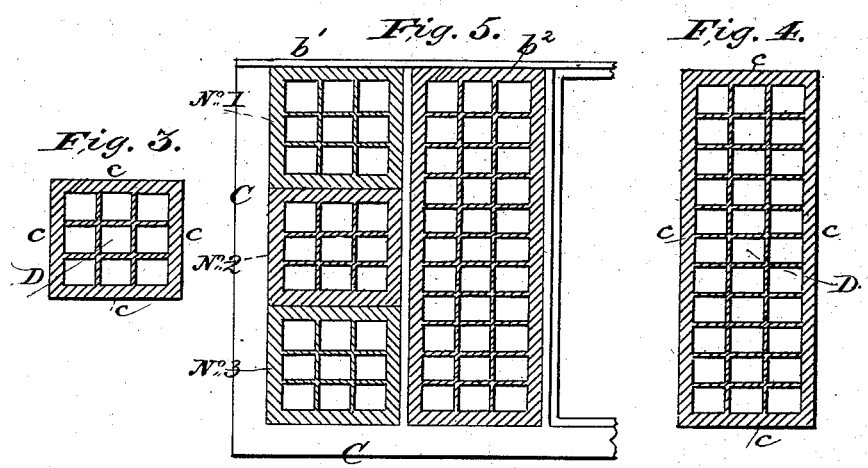
Witnesses:
T. C. Brecht
Guy L. De Motte
Inventor:
Thaddeus Hyatt

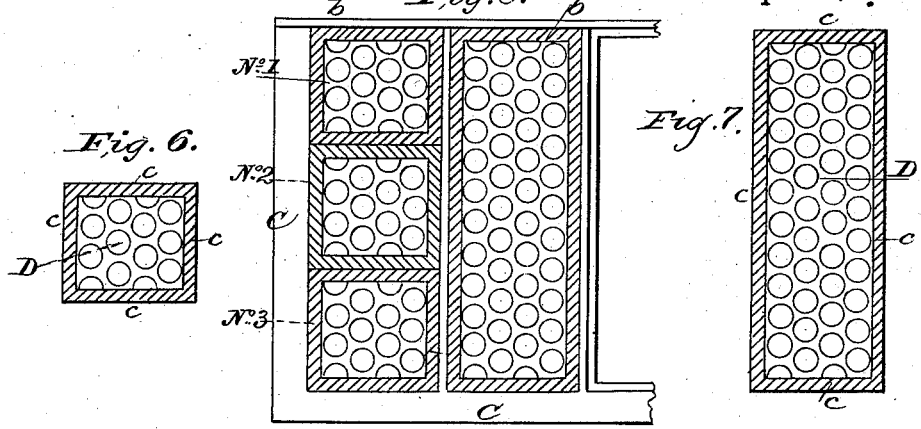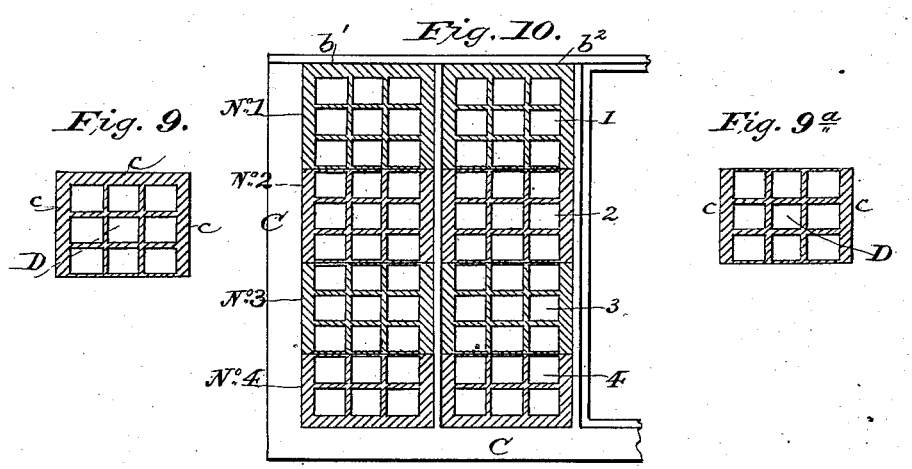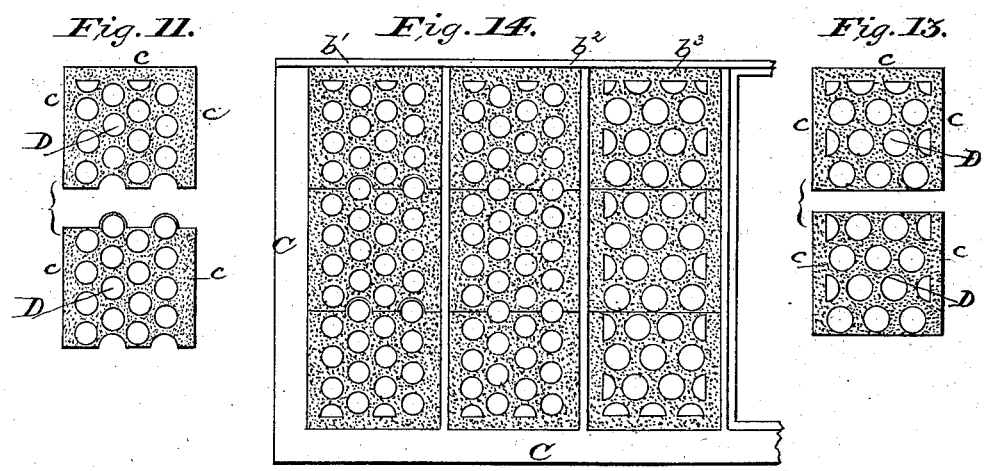

(No Model.) 3 Sheets—Sheet 3.

T. HYATT.
ILLUMINATING TILING AND GRATING FOR COVERING VAULTS, ROOFS, &c.

No. 315,412. Patented Apr. 7, 1885.

Witnesses:
T. C. Brecht
Guy L. DeMotte

Inventor:
Thaddeus Hyatt

UNITED STATES PATENT OFFICE.

THADDEUS HYATT, OF BROOKLYN, NEW YORK.

ILLUMINATING TILING AND GRATING FOR COVERING VAULTS, ROOFS, &c.

SPECIFICATION forming part of Letters Patent No. 315,412, dated April 7, 1885.

Application filed March 17, 1885. (No model.)

*To all whom it may concern:*

Be it known that I, THADDEUS HYATT, a citizen of the United States, residing at Brooklyn, in the county of Kings and State of New York, have invented certain new and useful Improvements in Illuminating Tilings and Gratings for Covering Vaults, Roofs, Pavements, and other Surfaces, of which the following is a specification, reference being had to the accompanying drawings.

Heretofore illuminating tiles or gratings have been always made to order in special sizes and shapes to suit the particular work in hand, according to the plans of architects, in each particular structure. Usually the opening to be covered by the illuminating-tiling is divided into large panels or sectional spaces, each one of which is closed by a tile made of a single casting, in order to secure the greatest amount of light, which would be lost if the panel-spaces were fitted with a number of small tiles, each made with the usual surrounding dead-work, borders, or margins.

Now, the great object of my present invention is to enable the manufacture of illuminating-tiling to be greatly cheapened, facilitated, and improved in such a way that it can be manufactured in large quantities in joinable sections or fractions of definite sizes and forms, which may be kept in stock and sold as regular articles of trade or manufacture, suitable for all kinds of architectural plans or structures, and which fractional pieces can be readily joined together in the panel-spaces of the structural frame-work without loss of light, and without requiring special castings or formations, as heretofore. Tiling made in this way will be obviously much cheaper and more convenient, and more perfect, and admit of wider and more general use, for when made in such small fractional and joinable sections the form of the tiling can be made much more accurate on account of reduction of warpage, and reduction of failures in casting; and when so made will be more portable, and can be much more easily and perfectly laid, thereby effecting a great and most desirable improvement in the art.

According to my present invention, therefore, I make illuminating-tiling in fractional sections or parts without dead-work borders on their juncture sides or edges, so that said fractions can be junctured directly together in the panel-spaces, to form complete illuminating panel-tiles without loss of light, and in a manner more easy and perfect than would be the case with the single or one casting panel-ties. In order to produce the best effect, I arrange the light-holes in these fractional sections on the honey-comb principle, or in groups of oblique-angled triangles, and I also arrange the light-holes in lines running crosswise to the panel or parallel with the junction sides of the fractional pieces, instead of longitudinally of the complete tile or panel, as has been usual. I also prefer to construct these fractional gratings of iron or other suitable material overlaid or faced with concrete or hydraulic cement, and in laying and securing the fractions in place I fit them into the panel-spaces with their junction sides abutting or approaching, and I then fill the joint-seams between the fractions and the construction-seams between the panel-tiles and the rafters or tile-supports of the panel-frame with cement—preferably hydraulic cement—which, uniting with the cement edges of the fractions and with the iron of the supporting or foundation frame, joins the fractions in a homogeneous manner, and at the same time binds the whole series of fractional gratings to and within the paneled frame-work in an exceedingly simple and inexpensive manner, without the necessity of bolting or mechanical fastenings, as heretofore employed, and at the same time produces the appearance of illuminating work made of the one-casting panel-tiles.

My invention therefore consists in the several features above outlined, as hereinafter fully set forth.

In specifying my invention I shall first refer to and describe the common system of tiling, in order that my present improvement may be better understood and appreciated and distinguished therefrom.

In the annexed drawings, Figures 1 to 8 illustrate the old or prevailing system previous to my present invention. Fig. 1 is a plan view indicating the structural opening or space to be covered or tiled. Fig. 2 is a similar view with the opening divided by cross bars or rafters into panel-spaces. Fig. 3 represents a small illuminating-tile made in the ordinary manner with a dead-work border or margin on all sides; and Fig. 4 represents a similar tile of larger size or a one-casting panel-tile as heretofore and commonly made to be used singly in panel-spaces. The light-holes in these tiles are square and arranged in squares, as shown in the figures. Fig. 5 represents part of a structural frame-work filled with tiles like those in Figs. 3 and 4. Figs. 6 and 7 illustrate tiles like those in Figs. 3 and 4, but with light-holes arranged on the honey-comb principle and in lines lengthwise of the panel-tile; and Fig. 8 is a plan of part of a structural frame-work filled with tiles of the last-named kind. Figs. 9 to 18 illustrate my present improvement. Fig. 9 is a plan of an end, and Fig. 9ᵃ of a middle, fractional tile or grating formed with square light-holes arranged in squares and made without dead-work borders on their junction sides or edges. Fig. 10 shows a portion of a paneled space or frame-work covered by combination-tiles made of fractional gratings like 9 and 9ᵃ. Figs. 11 and 12 illustrate two forms of my improved fractional gratings made with light-holes on the honey-comb plan running in longitudinal lines, but having different forms of junction edges. Fig. 13 shows a fractional grating made with light-holes on the honey-comb plan, but running in transverse lines parallel with the junction sides of the fractions. Fig. 14 shows a plan of a paneled space or frame-work fitted with combination-tiles made of the three aforesaid kinds of fractional gratings. Figs. 15, 16, 17, and 18 illustrate that part of my invention which relates to joining fractional gratings to each other and the whole to the structural frame-work without bolting or mechanical fastening. Fig. 15 represents combination-tiles combined with the structural frame-work without mechanical fastening. Panel-space b' shows the fractional gratings in place before the cement is put into the joint and construction seams, and panel-space b² shows the same when fixed by the cement. Fig. 16 represents a section on line x x of Fig. 15, showing the sides of the fractional gratings in elevation; Fig. 17 represents a section on line y y of Fig. 15, showing the ends of the fractional gratings in elevation, and Fig. 18 is an elevation showing the junction side of a fractional grating made as shown in Figs. 11 and 12.

Before proceeding to the general description I desire to define the special terms which I shall employ therein; and, First, "combination-tile" means a tile composed of fractions or parts put together with the effect of resembling the tiles in common use made in a single casting.

Second, "fractional gratings" mean gratings made naked—that is to say, without dead-work borders on their junction sides.

Third, "joint-seams" mean seams between fractional gratings where the junction sides thereof come together in forming combination-tiles.

Fourth, "construction-seams" mean seams between tiles and tile-supports in forming roofs or surfaces of illuminating-gratings.

Fifth, "construction-surfaces" mean roofs, floors, pavements, and surfaces made of illuminating-gratings.

Sixth, "illuminating-tile" means a one-casting tile or continuous light-field grating made and shaped for construction purposes in contradistinction to "vault-covers" or gratings made for closing coal-holes.

Seventh, "light-field" means the open-work or grating portion of an illuminating tile or grating.

Eighth, "dead-work border" means the blank portion of a tile that surrounds the light-field.

Ninth, "panel-tile" means (when employed in connection with roof, floor, and pavement construction) the illuminating portion or section of a construction surface contained between any two of its rafters or tile-supports.

Tenth, "one-casting panel-tile" means the section of a construction surface contained between any two of its rafters or tile-supports when such section is made of but one tile or light-field.

Eleventh, "sectional or panel spaces" mean the spaces or sections into which an opening is divided by rafters or tile-supports preparatory to being covered by tiles.

Twelfth, "material" means a substance equivalent to hydraulic cement for producing like construction results.

Thirteenth, "concreted grating" means a perforated plate or grating overlaid or faced with hydraulic cement, concrete, or material.

To understand what my improvements mean and their importance, it is necessary to understand what is meant by the "one-casting" panel-tile system, which I will now proceed to explain, and illustrate by the drawings.

Figs. 1 to 8 illustrate the system of patent-light construction now in general use, and which was invented by me, and introduced into public use thirty-five years ago, since which time it has remained in substantially the same condition. Fig. 1 represents an opening that requires to be covered over by illuminating-tiles. This opening may be regarded as at the rear of a building or at the front. A A, the face-line of the building; B, the opening; C, the coping around the opening.

Fig. 2 represents the opening when subdivided by cross-bars or rafters into sectional or panel spaces; a a, the rafters or cross-bars; b b, sectional or panel spaces.

Fig. 3 represents a small illuminating-tile wherein the light-holes are square, and arranged in straight lines that cross each other at right angles; D, the light-field of the tile; c c, dead-work borders of the tile.

Fig. 4 represents a large or one-casting panel-tile made with square light-holes.

Figure 15:
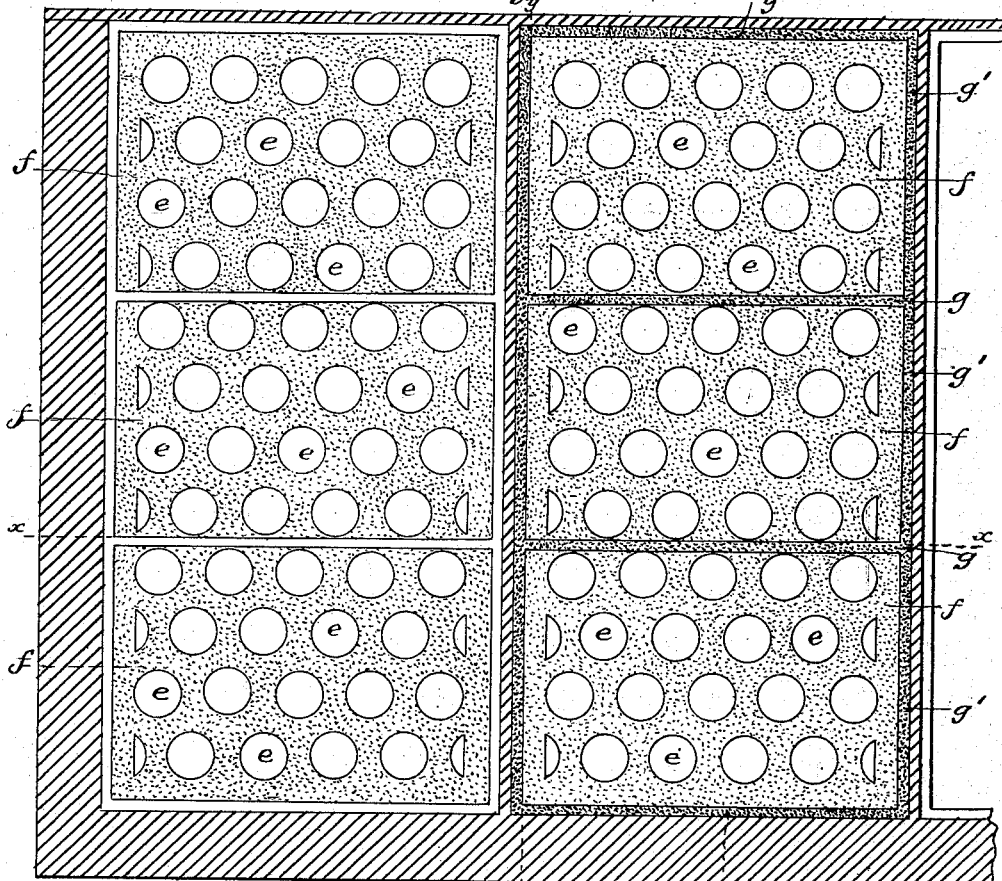

Fig. 5 represents a portion of an opening covered by tiles similar to Figs. 3 and 4. Sectional space b' illustrates the effect of employing several tiles of the ordinary kind to close such a space. Sectional space $b^2$ illustrates the effect of employing but one tile to close such a space.

Fig. 6 represents a small illuminating-tile made with light-holes grouped in clusters of oblique-angled triangles.

Fig. 7 represents a large or one-casting panel-tile similar to Fig. 6.

Fig. 8 represents a portion of an opening covered by tiles similar to Figs. 6 and 7.

Figs. 1 to 8 illustrate the system of patent-light manufacture and construction in use, and show the features that constitute both its merits and defects, both features of which must be fully understood in order to be able to comprehend and appreciate the nature and value of my improvements.

Fig. 1, an opening to be covered by illuminating-gratings, is designed to illustrate the practical fact that the size of openings to be covered thus is altogether too great to admit of being closed by any tile capable of being made in a single casting, such openings being in general from eight to sixteen or twenty feet long, and in width varying from three to ten or twelve feet. Fig. 2, therefore, represents the opening divided by rafters or tile-supports into sizes of convenient width and length to be closed by gratings that can be made in a single piece or casting. Now, if we consider Fig. 2 to represent a roof-space divided into sections $b$ $b$ $b$ by the rafters $a$ $a$ $a$, then, were this ordinary roof construction made with no regard to light, we should have the rafters crossed by purlins, cutting up and subdividing all the sectional spaces; but light being the purpose of the construction shown by the figures, the sectional spaces $b$ $b$ are left entirely open between the rafters to let in as much light as possible, and the illuminating-tiles manufactured to close such sectional spaces are made with direct reference to this prime necessity of the construction policy. Figs. 3, 4, 5 are designed to illustrate this point. Fig. 3 represents an illuminating-tile as ordinarily made, but so small that three of them are required to close one of the panel or section spaces of Fig. 5, as shown at $b'$.

Now, as by the common mode of constructing these gratings they are made each with a dead-work border, $c$ $c$ $c$ $c$, which entirely surrounds the light-field D of the tile on its four sides, as seen in Fig. 3, it follows, as illustrated at $b'$, Fig. 5, that the employment of such tiles is directly at variance with the construction policy of illuminating-roof making in which purlins are inadmissible, for it is plain to be seen that the dead-work border of tile No. 1 in sectional space $b'$, Fig. 5, where it abuts with the dead-work border of tile No. 2, produces a dead-line and loss of light equal to an equivalent interception of light by a purlin; and this loss of light in each one of the sectional spaces, when so closed by a number of small gratings of ordinary make, is augmented directly in proportion to the number of such tiles employed, as is further illustrated in $b'$, Fig. 5, where the dead-work borders of tiles 2 and 3 abut together. It follows from this that the fewer the tiles to each one of the sectional spaces the greater the light, and consequently that a single or one-casting tile is best of all when manufactured in the common way. This fact has become so generally recognized by architects and the public generally that the one-casting panel-tile system of manufacture and construction is now the universal mode the country over, and no manufacturer of patent lights has any chance of success unless he conforms to this established usage. At the same time it has been always felt to be a great drawback to the industry that illuminating-tiles cannot be manufactured to stock sizes and kept on hand to be sold as merchandise. Any manufactured article that can be kept in stock can be always manufactured more cheaply and to better advantage than when made to order. Making to order means paying the highest wages and buying the raw materials in the dearest market, and this enhances prices and restricts use and consumption.

Sectional space $b^2$, Fig. 5, illustrates the one-casting panel-tile system of construction, the principle of the construction as illustrated by the figure being a closure for the sectional space containing a light-field substantially coextensive with the area of the section of space covered by the tile. Panel-space $b'$, Fig. 5, contains three tiles, and consequently three light-fields, with necessarily two dead-work border-divisions running across the panel-light space of the structural frame-work, and with therefore a consequent and equivalent loss of light power; but panel-space $b^2$, containing but one tile, and therefore but one light-field, secures thereby the whole of the available light power of the sectional or panel space contained within the structural frame-work to which the illuminating-tiles are fixed. This one-casting panel-tile mode of construction secures the object of the invention as to light-power, but at a great sacrifice to the art as an industry, confining it to the condition of a mere handicraft, with but little, if any, importance beyond its own immediate centers of production and manufacture.

Drawing Fig. 5 reveals the defect of the present system, and at the same time reveals the primary cause—to wit, an illuminating-grating or light field entirely encircled by a dead-work border—the consequence of which, as shown at $b'$, is that the sectional or panel space of the foundation-frame thus closed is not only disfigured by the dead-lines of the dead-work borders where they cross the space between the light-fields of the separate tiles, but the light-power of the section-space to this extent also suffers a diminution of its illuminating-power.

Figs. 9, $9^a$, and 10 illustrate one form of my improved fractional gratings and construction. Fig. 9 represents a grating in all respects the same as Fig. 3, with the exception of being made with no dead-work border on its matching or junction side, which in this case is on its lower side, the grating being designed to form the end plate of a combination-tile. Fig. 9ª represents Fig. 9 with the top dead-work border removed, thus producing two junction sides, this grating being designed to form a middle plate in a combination-tile.

Fig. 10 illustrates the construction effect produced by the employment of my improved fractional gratings, an additional grating, (No. 4, Fig. 10,) containing six glasses, being obtained, as may be seen by comparing the four gratings contained in panel-spaces $b'$ $b^2$, Fig. 10, with the three tiles of ordinary make contained in panel-space $b'$, Fig. 5. It will also be seen that the combination-tile closures of panel-spaces $b'$ $b^2$, Fig. 10, contain each the same number of glasses as is contained in the one-casting panel-tile that forms the closure to $b^2$, Fig. 5.

The kind of fractional gratings shown in Figs. 9, 9ª, and 10, wherein the light-holes are arranged in straight parallel lines crossing each other at right angles, or in squares, are of comparatively easy formation as to junction sides; but more than eighty per cent. of all the illuminating-grating constructions in use are made of tiles wherein the light-holes are grouped in clusters of oblique-angled triangles, or on the honey-comb principle, which kind of tile is much more difficult to divide into fractional sections or parts, and at the same time form good junction sides that will not be embarrassed by the light-holes bordering the junction edges, and that likewise may be easily and readily fitted together.

Figs. 6, 7, and 8 represent the same tiles and constructions shown by Figs. 3, 4, and 5, with the difference only as to the shape and arrangement of the light-holes. As ordinarily made the light-holes in such tiles as are represented by Figs. 6 and 7 run lengthwise with the tile in parallel lines, the holes of one row breaking joint with those of the adjoining rows to right and left. In construction results the effect is the same as I have pointed out, whether tiles made on the honey-comb plan of light-holes or the others are employed; but inasmuch as the popular tiles and constructions in use are made with light-holes arranged on the honey-comb method, it is of great consequence to the success of the fractional gratings system of construction and manufacture to be able to make easily-joinable fractions with light-holes similar to those of the popular one-casting panel-tiles in common use, and this is accomplished with different degrees of advantage by the forms of the fractional gratings shown in Figs. 11, 12, 13, 14.

Figs. 11 and 12 are practically cross-sections of an illuminating-tile made according to the common mode of manufacture, wherein the light-holes run lengthwise with the tile, as illustrated by Fig. 7. Fig. 12 represents a fractional grating as though it were a section of Fig. 7 made by cutting through the light-holes. Fig. 11 represents a section of Fig. 7 made by cutting around the light-holes.

Fig. 13 represents a fractional grating with the light-holes so disposed therein as to run crosswise to the tile on the fractions being joined together, and with the junction edge or dividing line running straight across parallel with and outside of the outer line of holes.

It may now be noted by reference to Fig. 14 that when the fractional sections are made with the light-holes running in longitudinal lines the lines of division or junction lines must cut either through or around the holes, and hence form edges which are more difficult to fit together, or require some of the glasses to be inserted when the tiles are laid. Thus the objection to the form shown in Fig. 12, where the junction line bisects the light-holes, (shown more definitely by the combination-tile closure of panel-space $b^2$, Fig. 14,) is that one line of glass has to be set in at each junction line when the fractional tiles are laid in place, and the objection to the form shown in Fig. 11, where the junction edge is deeply scalloped, is that such edges are not easily and readily cemented together. It will be seen, however, that in Fig. 13, where the lines of light-holes run crosswise parallel to the lines of fractional division, the junction edges can run in a straight line across the tile and outside the outer line of holes, which, as seen in Fig. 14, produces a form of fractional grating which is much more perfect and simple than the others and is more easily fitted together.

Figure 16:
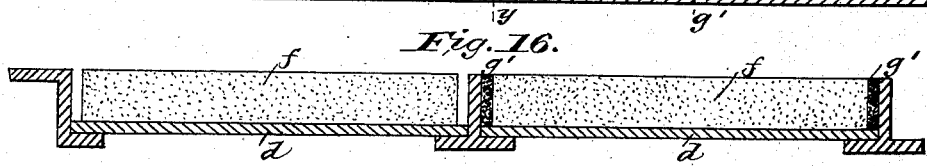
Figure 17:
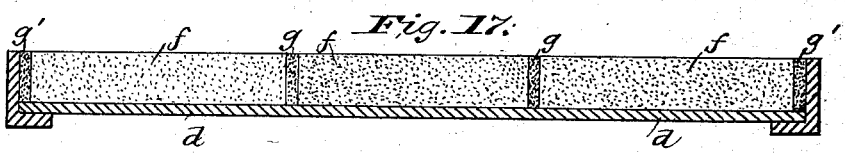
Figure 18:

Now, the gratings for my improved combination panel-tiles may be made, as usual, of cast-iron, having its perforations fitted with glasses secured therein in the usual way, and with the top surface of the casting either left smooth or studded with knobs around the glasses in the ordinary way; or, the gratings may be made of any other suitable material and with any desired formation of the upper surface. I greatly prefer, however, to make my fractional tiling with an underlying grating or base of cast-iron and an overlying facing of concrete or hydraulic cement or material, which, if desired, may fasten the glasses to the grating, and also at the same time form the walking or non-condensing surface of the combination-tile, as shown in Figs. 11 to 14, but seen best in Figs. 15, 16, 17, and 18, where $d$ indicates the iron or other base, $e$ the light-holes, and $f$ the concrete facing. This method of construction is specially adapted for my fractional tiling, and has great advantages therefor, especially in the laying and fastening of the fractions in their panels by the cementing method which I employ. Thus, by referring to Figs. 11 to 18 it will be seen that when the fractional gratings are made as described, not only will they be without dead-work borders on their junction sides, but will also have a raw or unfinished edge of hydraulic cement at the junction edges, which will be of a good width or depth vertically, as illustrated by Figs. 16, 17, and 18, which represent side elevations of fractional gratings overlaid with cement, 16 and 17 representing gratings wherein the rows of light-holes run transversely to the combination-tile, as seen in Fig. 15, and as a consequence produce junction sides with a raw edge of cement having no break in it by reason of the light-holes, whereas, when the light-holes run in the ordinary way, as shown in Figs. 11 and 12, and in Fig. 14 in panels $b'$ and $b^2$, the raw cement edge of the fractional grating is broken on the junction line, as shown in Fig. 18, where the light-holes $e\ e$ break the continuity of the raw concrete, and to this extent interfere with the perfection of the cement bond between the fractions when they are united to form the combination-tile. The advantage of concreting the fractional gratings is thus made manifest, and the further advantage of running the light-holes transversely to the combination-tile is clearly shown.

$g$ indicates the cement joint-seams between the fractional gratings, and $g'$ indicates cement construction-seams between the same and the structural frame-work that supports them.

It may, therefore, be now understood, referring to Figs. 15 to 18, that the fractional tiles made as described may be easily fitted into the panels of the foundation frame or structure, where their junction edges may closely approach to form one continuous combination-tile to cover said panel-space with the greatest possible amount of light admission, and when so placed cement can then be deposited in the sides of the fractional gratings in the joint-seams and between the sides of the combination-tiles, (thus formed *in loco*,) and the blades of the rafters or supporting cross-bars, and between the ends of the combination-tiles and the marginal surrounding border of the structural frame-work, as shown at $g$ and $g'$ in Figs. 15, 16, and 17, which cement will not only fix each fraction firmly to the borders of the panels of the foundation-frame, but will also unite the fractions together into one uniform tile; and if the cement employed be hydraulic cement, similar to the facing of the fractions, (which is what I recommend,) the fixation of the same will be homogeneous and particularly secure and solid, and each panel will present the appearance of being filled with one continuous tile of equivalent value in both use and beauty to the one-casting tiles commonly employed, but more cheaply and easily made, thereby producing very great advantages to the art of illuminating-tile manufacture; hence by this system of fractional construction and cement fixation the necessity of bolting the tiles to the framework, as usually performed, may be entirely dispensed with, the fractions being small and light being capable of being fixed by cement, and, being small, are easily cast without warpage, and therefore need no bolting to the frame-work to take them out of "wind," whereas the one-casting tiles being large and warped require bolting to bring them level and straight upon their beds in the structural frame-work. Hence my invention of fractional gratings and cement fixation as described serves both to render the joints water-proof and at the same time to secure the tiling permanently in place, which is a most important advantage in the art of patent-light construction. On the contrary, as has been already said, in the one-casting panel-tile system of construction bolting cannot be dispensed with on account of the usually irregular or warped form of the castings, which require bolting to bring them level and keep them so in the panels.

It will therefore be seen that the system of tiling herein described presents a great improvement over the old system in many important particulars. Thus when the tiling is made in small pieces or sections, as fractions of a combination-tile, such fractions can be manufactured very cheaply as stock material, and, being small, can be cast very accurately and as perfectly flat as stove-castings, true and free from the warpage that is unavoidable in large castings, thus enabling the fractional gratings, whatever the number of them used in the construction, to form a uniformly level surface by being simply laid in position one with another, in this way saving all the labor of fitting, bolting, and drilling now necessary in the one-casting tile constructions; secondly, the loss from imperfect castings will necessarily be much less than is the case with single-panel castings; thirdly, the fractional tiles will be very portable, and may be very easily handled in moving and laying the same, and will thus require less labor than would be the case with large and heavy castings; fourthly, they can be easily packed and transported; fifthly, they may be manufactured in large quantities in regular definite sizes and shapes, which may be easily catalogued and classified, and adapted for all kinds of architectural work, and may be thus kept in stock and sold as regular articles of merchandise, instead of being required to be made to order for each special job, as heretofore; finally, with all these advantages of economy and efficiency the new system gives the greatest possible amount of light in each panel, which, with the other results set forth, renders my invention an important and novel advance in the art of patent-light manufacture and construction.

What I claim as my invention is—

1. Illuminating tiling or gratings made in fractional panel-sections without dead-work borders on their junction sides or edges, and adapted to abut directly together to fill the panel-spaces without sacrifice of light, substantially as set forth.

2. Illuminating tiling or gratings made with light-holes arranged on the honey-comb principle, and divided into fractional sections directly across the field of light-holes, without dead-work borders on the dividing or junction lines, and adapted to abut directly together and form a continuous light-field in panel-spaces, substantially as herein shown and described.

3. Illuminating tiling or gratings made with light-holes arranged on the honey-comb plan or in groups of oblique-angled triangles, and disposed in parallel lines transverse to the light-field, said tiling being divided into fractional sections in transverse lines parallel with and outside of the lines of light-holes, and adapted to abut directly together to form a continuous light-field tile in panel-spaces, substantially as set forth.

4. Illuminating tiling or gratings made with an underlying sustaining-grating of cast iron or other supporting material, and an overlying facing of concrete or hydraulic cement, and divided into fractional sections adapted to abut together to fill panel-spaces, said sections being made without dead-work borders on their junction sides, and presenting a deep raw or unfinished edge of hydraulic cement at the junction edges, adapted to abut together and be secured in a homogeneous manner with hydraulic cement when laid into their panels, substantially as herein set forth.

5. Illuminating-tiling made in fractional sections fitted into panel-spaces with their junction edges abutting and secured together and to the panel-frame by cementation, substantially as herein set forth.

6. Illuminating-tiling made in fractional sections fitted into panel-spaces, and secured to the panel-frame and to each other by hydraulic cement deposited in the junction-seams of the fractional sections and in the construction-seams of the panel-frame, substantially as set forth.

7. Illuminating-tiling made with a hardened cement or concrete surface, and divided into fractional sections in lines crossing the light-field, without dead-work borders, and presenting on said dividing-lines raw edges of the cement, adapted to abut directly together and be secured in a homogeneous manner by similar hydraulic cement in a plastic state when the fractional sections are laid into panel-spaces, substantially as herein shown and described.

In testimony whereof I affix my signature in presence of two witnesses.

THADDEUS HYATT.

Witnesses:
T. C. BRECHT,
E. A. L. HYATT.